United States Patent
Hammond et al.

(10) Patent No.: US 9,475,968 B2
(45) Date of Patent: Oct. 25, 2016

(54) ULTRAVIOLET RADIATION CURABLE PRESSURE SENSITIVE ACRYLIC ADHESIVE

(71) Applicant: Ashland Licensing and Intellectual Property LLC, Dublin, OH (US)

(72) Inventors: Terry Emerson Hammond, Columbus, OH (US); Xiaochuan Hu, Dublin, OH (US)

(73) Assignee: ASHLAND LICENSING AND INTELLECTUAL PROPERTY, LLC, Dublin, OH (US)

( * ) Notice: Subject to any disclaimer, the term of this patent is extended or adjusted under 35 U.S.C. 154(b) by 0 days.

(21) Appl. No.: 14/250,896

(22) Filed: Apr. 11, 2014

(65) Prior Publication Data

US 2016/0046844 A1 Feb. 18, 2016

Related U.S. Application Data

(62) Division of application No. 12/751,190, filed on Mar. 31, 2010, now Pat. No. 8,735,506.

(60) Provisional application No. 61/166,431, filed on Apr. 3, 2009.

(51) Int. Cl.
  *C09J 133/14* (2006.01)
  *C08F 2/48* (2006.01)
  (Continued)

(52) U.S. Cl.
  CPC ............... *C09J 133/14* (2013.01); *B32B 7/12* (2013.01); *B32B 37/1284* (2013.01); *B32B 38/0008* (2013.01); *C08F 2/48* (2013.01); *C08F 8/00* (2013.01); *C09J 5/00* (2013.01); *C09J 133/066* (2013.01); *B29C 65/1406* (2013.01); *B29C 65/4815* (2013.01); *B29C 65/4825* (2013.01); *B29C 65/4845* (2013.01); *B29C 65/4865* (2013.01); *B29C 2035/0827* (2013.01); *B29K 2023/06* (2013.01); *B29K 2023/065* (2013.01);
  (Continued)

(58) Field of Classification Search
  CPC ...... C09J 133/14; C09J 5/00; C09J 133/066; B32B 7/12; B32B 37/1284; B32B 38/0008; C08F 2/48; C08F 8/00
  See application file for complete search history.

(56) References Cited

U.S. PATENT DOCUMENTS

| 4,614,761 A | 9/1986 | Takiyama et al. |
| 4,668,763 A | 5/1987 | Muller et al. |

(Continued)

FOREIGN PATENT DOCUMENTS

| JP | 3258868 A | 11/1991 |
| JP | 4306282 A | 10/1992 |

(Continued)

OTHER PUBLICATIONS

"UV curing of pressure sensitive adhesives studied by real-time FTIR-ATR spectroscopy" Tom Scherzer er al.

*Primary Examiner* — Michael L Leonard
(74) *Attorney, Agent, or Firm* — William J. Davis

(57) ABSTRACT

A process for making UV curable pressure sensitive adhesive compositions by derivatizing an acrylic polymer with a derivatizing agent prepared from a hydroxy-functional acrylate monomer and a diisocyanate. The derivatizing agent typically has a ratio of hydroxy-functional acrylate monomer to diisocyanate greater than about 1:1. Also disclosed are UV curable pressure sensitive adhesives made with the derivatizing agent and methods for adhering substrates with pressure sensitive adhesive compositions.

20 Claims, 1 Drawing Sheet

(51) Int. Cl.
*C08F 8/00* (2006.01)
*C09J 5/00* (2006.01)
*C09J 133/06* (2006.01)
*B32B 7/12* (2006.01)
*B32B 37/12* (2006.01)
*B32B 38/00* (2006.01)
*B29C 65/14* (2006.01)
*B29C 65/48* (2006.01)
*B29C 35/08* (2006.01)
*B29K 23/00* (2006.01)

(52) U.S. Cl.
CPC .... *B29K 2023/12* (2013.01); *B32B 2037/1253* (2013.01); *B32B 2250/02* (2013.01); *B32B 2255/26* (2013.01); *B32B 2310/0831* (2013.01); *B32B 2405/00* (2013.01); *C08F 2800/20* (2013.01); *C08F 2810/20* (2013.01); *C09J 2201/606* (2013.01); *C09J 2205/31* (2013.01); *Y10T 428/1462* (2015.01); *Y10T 428/31551* (2015.04)

(56) References Cited

U.S. PATENT DOCUMENTS

| | | |
|---|---|---|
| 4,690,502 A | 9/1987 | Zimmerman et al. |
| 4,806,574 A | 2/1989 | Krajewski et al. |
| 5,128,386 A | 7/1992 | Rehmer et al. |
| 5,206,417 A | 4/1993 | Boettcher et al. |
| 5,223,645 A | 6/1993 | Barwich et al. |
| 5,298,554 A | 3/1994 | Rehmer et al. |
| 5,391,406 A * | 2/1995 | Ramharack ......... C09J 133/062 427/516 |
| 5,536,756 A | 7/1996 | Kida et al. |
| 6,694,999 B2 | 2/2004 | Hettinger |
| 6,753,394 B2 | 6/2004 | Weikard et al. |
| 6,982,107 B1 | 1/2006 | Hennen |
| 2003/0129385 A1 | 7/2003 | Hojo et al. |
| 2003/0129390 A1 | 7/2003 | Husemann et al. |
| 2006/0084713 A1 | 4/2006 | Bach et al. |
| 2006/0142408 A1 | 6/2006 | Liu et al. |
| 2009/0075008 A1 | 3/2009 | Hwang et al. |

FOREIGN PATENT DOCUMENTS

| | | |
|---|---|---|
| JP | 4326966 A | 11/1992 |
| JP | 5320539 A | 12/1993 |
| JP | 2002173516 A | 6/2002 |
| JP | 2003129004 A | 5/2003 |
| JP | 2006066909 A | 3/2006 |
| JP | 2008069239 A | 3/2008 |
| JP | 2008162027 A | 7/2008 |

* cited by examiner

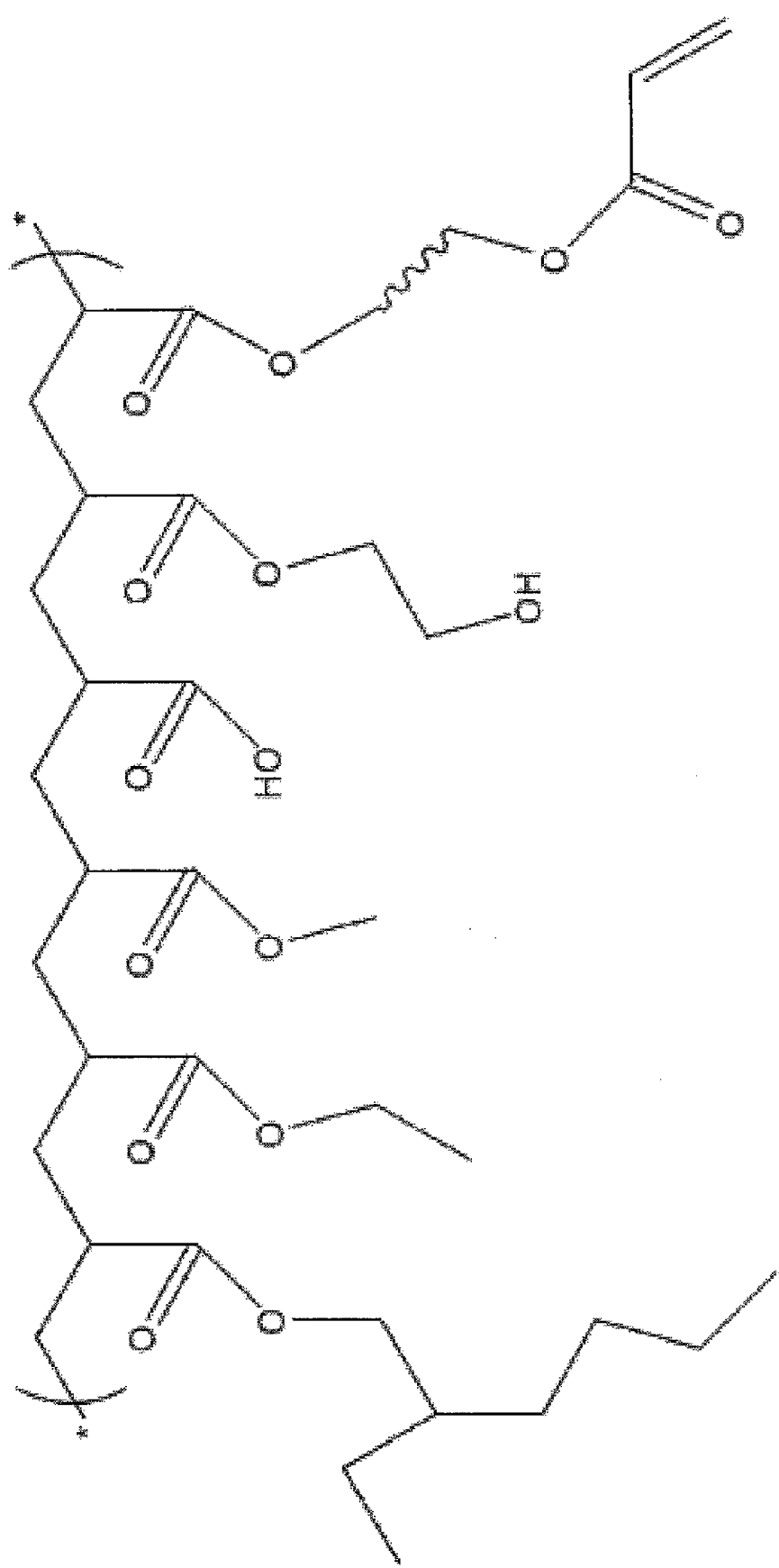

ULTRAVIOLET RADIATION CURABLE PRESSURE SENSITIVE ACRYLIC ADHESIVE

CROSS REFERENCE TO RELATED APPLICATIONS

This application is a divisional application of U.S. patent application Ser. No. 12/751,190, filed Mar. 31, 2010, presently pending, which claims the benefit of U.S. Patent Application No. 61/166,431, filed Apr. 3, 2009. U.S. Patent Application No. 61/166,431 and U.S. patent application Ser. No. 12/751,190 are incorporated herein in their entirety by reference.

BACKGROUND OF THE INVENTION

1. Field of the Invention

The invention concerns a process of making an ultraviolet ("UV") curable pressure sensitive adhesives ("PSA") by derivatizing an acrylic polymer, such as a hydroxy-functional acrylic polymer, with a derivatizing agent prepared from a diisocyanate and a hydroxy-functional acrylate monomer.

2. The Related Art

Solvent based PSA typically have low solids content, such as from about 40% to about 55% solids. The coating process from solution generally limits the effective coating thickness for common applications, as it is difficult to evaporate solvents from a thick film. However, for many applications, thicker films are desired. Hot melt adhesives offer an avenue to easily generate thick films. Historically, most hot melt adhesives are rubber-based, and have limitations in performance.

UV curable acrylic hot melt PSA offer a potentially attractive alternative to rubber based hot melt adhesives, as lightly crosslinked acrylic adhesives have premium peel and shear performance, as well as outstanding weathering and aging performance compared to rubber based adhesives. However, many attempts at a UV curable acrylic PSA have had limited commercial success for thick film applications. This is generally due to inefficiency in uniformly curing thicker films through the complete depth of the film.

A primary limitation for UV curable PSA in certain commercial applications is due to the nature of the photoinitiator entity. For these adhesive products, the photoinitiator is built into the acrylic polymer backbone by free radical polymerization of an acrylated benzophenone. The built-in benzophenone entity is incorporated at a level of about 0.5% to about 1.0%. The benzophenone group is a very strong UV absorber, and is a strong hydrogen abstracter when excited by UV. The hydrogen-abstraction process causes free radicals to be generated. When these free radicals recombine, it causes a slight crosslinking of the polymer. This crosslinking is the key to converting a melt-flowable polymer into an adequate PSA. However, there is a depth limitation for the cure of the benzophenone-based polymers. Due to benzophenone's strong absorbance at 258 nm, UV radiation at this wavelength cannot pass through a sample depth of greater than approximately 70 um (about 2.7 mils). Therefore, for practical purposes, a benzophenone based UV curable PSA can only be uniformly cured at thicknesses of 2 mils or less.

Other patents in the area of UV curable acrylic hot melt PSA include adhesive compositions comprising a combination of built-in photoinitiator and olefinic components to facilitate crosslinking. Separately, an acrylate functional polyurethane has been touted as UV curable warm melt PSA. All of these hot melt PSA are 100% solids with no volatile organic content ("VOC") during application, eliminating the need for drying ovens and incinerators/thermal oxidizers.

All parts and percentages set forth herein are on a weight-by-weight basis unless otherwise specified.

SUMMARY OF THE INVENTION

The invention pertains to a process to make a UV curable PSA from a hydroxy-functionalized acrylic polymer comprising derivatizing the polymer with a derivatizing agent prepared from a diisocyanate and a hydroxy-functional acrylate monomer. The hydroxyls in the acrylic polymer react with the derivatizing agent to form a urethane linkage. This process generates an acrylate-functional acrylic polymer that can be cured by UV irradiation.

The derivatizing agent is prepared from a diisocyanate comprising differential reactivity between the two isocyanate groups, such that the reaction with one equivalent of hydroxy-functional acrylate monomer yields primarily a monourethane and not a random distribution of monourethane, diurethane, and unreacted diisocyanate. By generating predominantly acrylated monourethane with little or no remaining diisocyanate, addition to the hydroxy-functional acrylic polymer will not cause significant molecular weight increase. The remaining isocyanate will simply add to the alcohol groups in the acrylic polymer, and generate an acrylate functional acrylic polymer. The acrylate-functionalized acrylic polymer can be UV curable at greater adhesive film thicknesses than typically encountered with benzophenone substituted UV curable PSA products.

Generally, the acrylate-functionalized acrylic polymer by itself is not UV curable. Thus, in the process the acrylic polymer must be formulated with appropriate photoinitiator additives. The adhesive may further comprise fillers and additives, such as tackifiers, cross-linking agents, stabilizers, inhibitors, solvents, plasticizers, and the like, and combinations thereof.

The PSA may be applied in methods of adhering materials. The methods comprise the steps of providing substrate materials for the PSA, applying the PSA to a surface of a substrate, UV curing the adhesive and mating and adhering the substrate material to another substrate material, preferably with the application of pressure.

DESCRIPTION OF THE DRAWINGS

FIG. 1 shows a functionalized acrylic polymer in accordance with an embodiment of the invention.

DETAILED DESCRIPTION OF THE INVENTION

The hydroxy-functionalized polymer is typically an acrylic polymer having a molecular weight of about 40,000 to about 100,000. Acrylic monomers that may be used for the invention comprise a large percentage of a monomer that generates a low glass transition temperature (Tg) polymer. Such monomers include those selected from the group consisting of 2-ethylhexyl acrylate, iso-octyl acrylate, iso-decyl acrylate, lauryl acrylate, n-butyl acrylate and the like, and combinations thereof.

The acrylic polymer may further comprise monomers that modify the Tg, such as those selected from the group consisting of methyl acrylate, ethyl acrylate, methyl methacrylate, styrene, vinyl acetate and combinations thereof. For derivatization with isocyanate, at least one hydroxy-functional monomer must be incorporated into the backbone of the acrylic polymer. Using the Fox equation, the calculated Tg of the acrylic polymer before derivatization and UV cure should ideally be in the range of about −35° C. to about −50° C., preferably about −40° C. to about −45° C. These hydroxy-functional monomers, the backbone hydroxy-functional monomer(s), are separate from the hydroxy-functional monomer(s) of the derivatizing agent, which is the agent hydroxy-functional monomer. Examples of hydroxy-functional monomers, that may be incorporated into the backbone of the acrylic polymer include: 2-hydroxyethyl acrylate, 2-hydroxyethyl methacrylate, 2-hydroxypropyl acrylate, 2-hydroxypropyl methacrylate, 4-hydroxybutyl acrylate and the like and combinations thereof. The acrylic polymer may also comprise other functional monomers to enhance adhesion properties such as those selected from the group consisting of acrylic acid, methacrylic acid, maleic anhydride, glycidyl methacrylate, N-vinyl pyrrolidone, N-vinyl caprolactam, and acrylamide, and combinations thereof.

The derivatizing agent is prepared such that most, if not all, of the molecules in the adduct will generally comprise at least about one reactive isocyanate group, and in an embodiment most molecules in the derivatizing agent comprise one reactive isocyanate group. The isocyanate group reacts with the hydroxyls in the acrylic polymer to form a urethane linkage, and this linkage attaches the acrylate double bond functionality to the acrylic polymer. This attachment makes the acrylic polymer reactive to free radical polymerization reactions. A typical functionalized acrylic polymer useful in the invention is shown in FIG. 1.

The derivatizing agent is prepared from a diisocyanate and a hydroxy-functional acrylate monomer, the agent hydroxy-functional monomer. The diisocyanate will generally comprise differential reactivity between the two isocyanate groups, such that only one isocyanate can be preferentially reacted with the hydroxy-functional acrylate monomer of the derivatizing agent, leaving the other isocyanate available for later reaction with the acrylic polymer. Diisocyanates useful in the invention include isophorone diisocyanate, toluene diisocyanate and the like and combinations thereof. The hydroxy-functional acrylate monomer in the derivatizing agent may be selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate and the like and combinations thereof. Specialty hydroxy-functional acrylates like caprolactone acrylate (SARTOMER® 495, available from the Sartomer Company, Inc., Exton, Pa.) or ACE™ hydroxyl acrylate monomers from HEXION™ Specialties Chemicals, Columbus, Ohio can also be used.

The ratio of hydroxy-functional acrylate monomer to diisocyanate in the derivatizing agent is typically greater than about 1:1, preferably greater than about 1.1:1. In embodiments of the invention, the ratio of hydroxy-functional acrylate monomer to diisocyanate in the derivatizing agent is from about 1.1:1 to about 1.5:1, typically about 1.05:1 to about 1.5:1, preferably from about 1.12:1 to about 1.2:1. A typical ratio range of hydroxy-functional acrylate monomer to diisocyanate is from about 1.05:1 to about 1.2:1. At low ratios of hydroxy-functional acrylate monomer to diisocyanate, there is often diisocyanate still present in the derivatizing agent. If too much free diisocyanate is present in the derivatizing agent, then reaction of the diisocyanate with hydroxys in the acrylic polymer causes a significant molecular weight increase that makes the polymer difficult or impossible to process, and may even cause gelation of the acrylic polymer. At ratios of hydroxy-functional acrylate monomer to diisocyanate in the derivatizing agent of greater than 1:1, there is a portion of the diisocyanate that reacts with two hydroxy-functional acrylate monomers in the derivatizing agent to become a diurethane. This species does not function as a derivatizing agent, but simply becomes a reactive diluent and difunctional crosslinking agent for the UV cure of the polymer.

The amount of derivatizing agent reacted with the polymer is relevant to the properties of the adhesive. If too little is reacted, the polymer will not crosslink sufficiently during UV cure to give good properties. If too much is reacted, the polymers will over-crosslink during UV cure, and properties may be compromised. In embodiments, the PSA composition should preferably comprise about 2.0% to about 9.0% of the hydroxy-functional acrylic diisocyanate derivatizing agent, preferably about 3.5% to about 7.5%, by weight solids. The level of the derivatizing agent is a function of the molecular weight of the acrylic polymer. At low molecular weights, a higher degree of derivatization may be required, while at higher molecular weights, a lower degree of derivatization may be required.

The derivatized acrylic polymer is incorporated into UV curable PSA compositions. The PSA compositions comprising the derivatized acrylic polymer may be a 100% solids composition for hot melt applications. Also, the PSA compositions may be in the form of a solution adhesive, including those having a solids content ranging from about 50% to about 80%, preferably about 60% to about 75%.

In addition to the derivatized acrylic polymer, the UV curable PSA compositions comprise photoinitiators which generate free radicals during UV exposure and induce free radical polymerization of the active acrylate groups. Various types of photoinitiators may be used. Photoinitiators may be selected from commercially available photoinitiators provided that the photoinitiator is matched to the UV lamp that is used, and such that there is no strongly absorbing component of the adhesive that would block the UV absorbance of the photoinitiator. Care must be taken when using UV-curable monomers and additives that contain aromatic functionality. Most photoinitiators absorb strongly in the 250-300 nm region of the UV spectrum, but most other aromatics can also absorb in this region.

The photoinitiator component may comprise Norrish Type I or Type II initiators, or combinations thereof. Norrish Type I initiators cleave into two radical species when excited by UV. Either one or both radicals may induce polymerization. Examples of Norrish Type I photoinitiators useful in the invention include benzil, benzoin ethers, benzil esters, hydroxyacetophenones, phosphine oxides and the like and combinations thereof. Norrish Type II initiators abstract hydrogen radicals when excited. The active polymerization initiator is typically the species that lost the hydrogen radical. Examples of Norrish Type II initiators useful in the invention include benzophenone, thioxanthone and the like and combinations thereof.

Photoinitiators that work into the visible region are very effective, as there are typically no other strong absorbers in this region, and such photoinitiator may provide good through-cure on relatively thicker samples, such as when a thicker layer or layers of the UV curable PSA are applied to a substrate. Phosphine oxides like monoacyl phosphine oxide (such as Daracure TPO) or biacyl phosphine oxide ("BAPO") (such as IRGACURE® 819) are effective in this regard.

Photoinitiators may be selected to provide good surface cure, as a critical radical flux is needed to overcome oxygen inhibition at the surface of adhesives UV cured in air. Benzophenones, benzoin ethers, hydroxyacetophenones and the like and combinations thereof may be used in this regard. In embodiments of the UV curable PSA composition, surface cure can be critical, as this is the point of contact for the adhesive to the substrate. Without complete surface cure, a layer of undercured adhesive can transfer to the substrate when the adhesive is removed. This situation is referred to as ghosting, and is a common problem for UV cured adhesives.

Combinations of photoinitiators described above may be used. For example, the photoinitiator component may comprise hydroxyacetophenone (such as Duracure 1173, IRGACURE® 184 or ESACURE® KIP150) and a benzophenone. In applications where the PSA will be applied in thicker films, the photoinitiator may comprise BAPO to provide good thru-cure. In embodiments of the invention the photoinitiator contains the combination of hydroxyacetophenone and benzophenone, and may contain the combination of hydroxyacetophenone, benzophenone and BAPO.

Additionally, the UV curable PSA composition may comprise one or more inhibitors. Because the UV curable PSA composition comprises reactive acrylate groups, a viable free radical scavenger may be present to prevent premature gelation, either in storage or preparation for coating, especially in the case of hot melt adhesive compositions. Inhibitors comprising phenolic compounds are one class of such materials that may be used in the invention, including, for example, 4-methoxyphenol (MEHQ, methyl ether of hydroquinone), hydroquinone, 2-methylhydroquinone, 2-t-butylhydroquinone, t-butyl catechol, butylated hydroxy toluene, and butylated hydroxy anisole and the like and combinations thereof. Other inhibitors that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Combinations of inhibitors may be used.

The PSA composition may also comprise one or more further components. Typically, these further components are selected form the group consisting of tackifiers, crosslinking agents, stabilizers, fillers, solvents, plasticizers and the like. Combinations of these materials may be used. The amount and type of these further components may be a function of the intended application of the PSA. For example, PSA compositions for low surface energy substrates will usually comprise tackifiers for peel performance. For high shear applications, a crosslinking agent may be of importance. For applications where the adhesive may experience temperature extremes, stabilizers may be used in the formulations.

The use of tackifier is preferred if low surface energy adhesion is a desired property of the PSA. Particularly effective and compatible with the acrylate polymer are rosin esters, preferably hydrogenated rosin esters. For higher temperature applications, glycerol tris-rosinate (FORAL® 85 available from Pinova Inc., Brunswick, Ga., USA and pentaerythritol tetra-rosinate (FORAL® 105 available from Pinova Inc.), and mixtures thereof are preferred. Other tackifiers that may be used include hydrocarbon $C_5$ and $C_9$ tackifiers, generally in amounts up to about 5% loading for acrylic compatibility. Overall loading of the tackifiers may range from about 10% to about 30%, and more typically about 15% to about 25%.

Cross linking agents useful in the invention, which generally enhance crosslink density in the UV cured adhesive, include multifunctional acrylate species. By increasing the crosslink density, the cohesive properties of the adhesive will improve, and shear performance should be enhanced. However, the selection and level of the crosslinking agent needs to be carefully determined. With the wrong type or level of multifunctional acrylate, the crosslink density can be much higher than desired, and peel performance will be greatly compromised. Multifunctional acrylates made from ethoxylated diols or triols are preferred cross linking agents, such as ethoxylated hexanediol diacrylate, ethoxylated trimethylolpropane triacrylate and the like and combinations thereof. Ethoxylated acrylates are generally more reactive than non-ethoxylated acrylates, in that the hydrogen atoms on the carbon next to the ether have been found to be labile and participate in the polymerization process. The UV curable PSA compositions may comprise about 1% to about 5%, preferably about 2% to about 3%, cross linking agent.

The UV curable PSA described herein may be used for adhering substrates. A typical method for application of the UV curable PSA compositions comprises the steps of:

a. providing at least a first substrate and a second substrate each having one or more surfaces;

b. providing the PSA described herein;

c. applying the PSA to a surface of the first substrate;

d. UV curing the PSA; and e. mating the surface of the first substrate having the PSA with a surface of the second substrate to adhere the first substrate and the second substrate.

In embodiments, the PSA may be applied to surfaces of both the first substrate and second substrate. In addition, the PSA may be coated and cured on release liner, and then be used as a two-sided transfer tape.

The PSA of the invention may be applied in relatively larger thicknesses than conventional PSA, yet achieve an acceptable UV cure. The PSA compositions may generally be applied to the substrate at thicknesses greater than or equal to about 2 mils, such as greater than about 3 mils, like in the range of about 2 mils to about 5 mils, typically about 2.5 mils to about 5 mils, including about 3 mils to about 5 mils. Typical substrates include mylar, polypropylene, polyethylene, high density polyethylene and the like.

EXAMPLES

Film Preparation and Testing

Adhesive films for testing were prepared by applying the PSA in solution form onto a substrate using standard drawdown equipment, followed by periods of air and oven drying. Alternatively, hot melt films were prepared using a heated drawdown station. Films were coated at a thickness of about 1 to about 5 mils on a poly(ethylene terephthalate) substrate for testing. Once applied and dried, the films were subjected to UV irradiation using a Fusion Systems 600-Watt device equipped with an H-bulb. Light dosages were adjusted by variation of the conveyor belt speed.

Pressure Sensitive Tape Council ("PSTC") test methods were employed for evaluation of adhesive performance, primarily PSTC Test Method #1 for peel strength and PTSC Test Method #7 for shear adhesion failure time. PSTC Test Method #1 and PTSC Test Method #7 are incorporated herein by reference in their entirety.

Example 1

Base Polymer Synthesis

A mixture of monomers and chain transfer agent having the components set forth below was prepared.

| | |
|---|---|
| 607 g | 2-Ethylhexyl Acrylate |
| 189 g | Ethyl Acrylate |
| 150 g | Methyl Acrylate |
| 25 g | 2-Hydroxyethyl Acrylate |
| 25 g | Acrylic Acid |
| 4 g | 1-Dodecanethiol |

This mixture of monomers and chain transfer agent was placed in an addition tank with a feed pump. 355 g of ethyl acetate was added into a 2-liter water jacketed reactor. The jacket temperature was set to 85° C., and the ethyl acetate was heated until a good reflux was obtained. Also, a slow nitrogen purge passed through the headspace of the reactor. The reactor contents were stirred at 130-150 rpm during the course of the reaction. Separately, a solution of 4 g dilauroyl peroxide and 37 g of ethyl acetate were prepared. After 20 minutes of solvent reflux, the monomer solution and the peroxide solution were separately fed into the reactor. Monomer feed time was 90 minutes and peroxide feed time was 120 minutes. At the end of the feeds, an additional 42 g of ethyl acetate was used to wash the feed systems. The reaction mixture continued to heat for an additional 5 hours after the feeds were complete. After this time period, the reaction mixture was cooled to below 50° C., and then bottled. Final polymer solids were theoretically 69.8 wt %. Analysis of the polymer solution indicated 99.4% conversion of the monomers, and a polymer number average molecular weight (Mn) of 39,881 g/mole and weight average molecular weight (Mw) of 105,306 g/mole, as measured by gel permeation chromatography.

Derivatizing Agent Preparation

The preparation of the derivatizing agent was done in a 500 g reactor flask, with the following components added to the reactor.

| | |
|---|---|
| 111.1 g (0.5 mole) | isophorone diisocyanate ("IPDI") |
| 71.4 g | ethyl acetate |
| 0.04 g | dibutyltin dilaurate ("DBTDL") |
| 0.02 g | butylated hydroxy toluene ("BHT") as an inhibitor/stabilizer |

The mixture was stirred and heated to 35° C. in the flask. 58.0 g (0.5 mole) of 2-hydroxyethyl acrylate (HEA) was slowly added through an addition funnel to the reaction mixture over a 60 minute time period to allow selective addition of the hydroxyl to the most reactive isocyanate group of IPDI. The reaction mixture was continuously stirred for an additional 30 minutes, and then the temperature was slowly raised to 50° C., and then held there for 60 minutes. By NMR, the 2-HEA was verified to have completely reacted with the IPDI. Carbon-13 NMR strongly indicated a nearly complete consumption of one isocyanate group over the other, based on the residual NCO group at 122-124 ppm.

Derivatization of the Acrylic Polymer

To demonstrate feasibility of derivatization, 100 g of the base polymer solution prepared as discussed above was added to an 8-oz jar. Additionally, 0.04 g DBTDL and 0.01 g BHT were added to this solution and thoroughly mixed. Then, 4.7 g of the derivatizing agent solution prepared as discussed above was added to the base polymer (with 0.04 g DBTDL and 0.01 g BHT), and again thoroughly mixed. This mixture of derivatizing agent solution and base polymer was then heated for 30 minutes at 75° C. To stabilize the mixture after reaction, 0.01 g of MEHQ inhibitor was added. MEHQ is not an effective inhibitor before the isocyanate reaction, as it readily reacts with the isocyanate and is deactivated. FT-1R verified the complete reaction of the isocyanate group to form urethane functionality by reaction with the hydroxyls in the polymer.

Effect of HEA/IPDI Ratio

Even though the controlled addition of HEA to IDPI preferentially reacts with one isocyanate group, there is still a distribution of unreacted IPDI, monourethane, and diurethane. The free IPDI can greatly influence the molecular weight distribution of the polymer, as it can cause bridging of two polymer chains. By adjusting the ratio of HEA to IPDI, the level of free IPDI can be minimized. A series of formulations (1A-1F) were made from the base polymer and derivatizing agent solution as discussed above with varying ratios of HEA to IPDI as set forth in Table 1, below (Formula 1A being the base polymer without derivatizing agent). The level of the derivation was kept the same for each formulation. The effect of free IPDI to the molecular weight distribution is shown in the results set forth in Table 1.

TABLE 1

| Formulation | HEA/IPDI Ratio | Mn | Mw |
|---|---|---|---|
| 1A - Base Polymer | — | 39,881 | 105,306 |
| 1B | 1.00 | 38,887 | 340,026 |
| 1C | 1.05 | 40,534 | 163,121 |
| 1D | 1.10 | 40,208 | 134,846 |
| 1E | 1.20 | 38,622 | 112,917 |
| 1F | 1.50 | 37,919 | 102,076 |

Adhesive Performance

The polymer base described above was derivatized at 3.3% active derivatization agent (solids-to-solids basis) using a derivatizing agent with an HEA/IPDI ratio of 1.12:1, and reacting under comparable conditions as described above. The derivatized resin was formulated with 1.5% Lamberti ESACURE KIP150 photoinitiator. A dried coating of 2-mil was prepared on poly(ethylene terephthalate) and UV cured at 125 ft/min on a FUSION UV SYSTEMS, INC.® ("Fusion Systems") 600-Watt device with an H-bulb. UV dosage as measured by a "light bug" was 139 mJ/cm$^2$ UV-A, 95 mJ/cm$^2$ UV-B, and 17 mJ/cm$^2$ UV-C. Adhesive performance was evaluated by measuring 180 peel strength on SS (24-hour dwell) which resulted in 3.6 lb/in with adhesive failure and also by measuring shear failure time (1"×1"×2 kg) which resulted in greater than 300 hours with no slippage. This data indicates performance in-line or better than many commercial PSA. It has been demonstrated that UV cure often gives shear performance that is significantly better than typical commercial PSA products.

Example 2

The base polymer described in Example 1 was derivatized at 4.4% active derivatizing agent, which had an HEA/IPDI ratio of 1.12:1. The derivatized base was then formulated as shown below, on a solids basis:

| | |
|---|---|
| 72.4 g | Derivatized Base Resin |
| 13.0 g | Pinova FORAL 85 Rosin Ester Tackifier |
| 9.0 g | Pinova FORAL 105 Rosin Ester Tackifier |
| 2.6 g | Rahn AG M3130 Trifunctional Acrylate |

| | |
|---|---|
| 2.0 g | Lamberti ESACURE KIP150 Photoinitiator |
| 1.0 g | Cytec Industries, Inc. P-36 Photoinitiator |

Adhesive films were prepared from this formulation at 1.3 mils thickness and cured at 125 ft/min on the Fusion Systems 600-Watt unit with an H-bulb. Adhesive performance was measured by 180° Peels, RT Shear adhesion failure time, 160° F. Shear adhesion failure time and 200° F. Shear adhesion failure time. The 180° Peels on SS (24-hour dwell) resulted in 4.6 lb/in with adhesive failure and 180° Peels on HDPE (24-hour dwell) resulted in 2.0 lb/in with adhesive failure. RT Shear adhesion failure time (1"×1"×1 kg) was greater than 2 weeks with no failure, the RT Shear adhesion failure time (1"×1"×5 lbs) was greater than 2 weeks with no failure and the RT Shear adhesion failure time (1"×1"×10 lbs) was 8.3 hours with adhesive failure. The 160° F. Shear adhesion failure time (1"×1"×1 kg) was greater than 2 weeks with no failure and the 200° F. Shear adhesion failure time (1"×1"×1 kg) was greater than 2 weeks with no failure.

The data demonstrates that in addition to excellent peel and room temperature shear, the UV cured products have excellent high temperature shear performance. With the addition of tackifiers, the product also has excellent adhesion to low surface energy substrates.

What is claimed is:

1. An ultraviolet ("UV") curable pressure sensitive adhesive composition made by a process comprising the step of derivatizing an acrylic polymer with about 2% to about 9% by weight solids of a derivatizing agent prepared from a hydroxy-functional acrylate monomer and a diisocyanate selected from the group consisting of isophorone diisocyanate, toluene diisocyanate and combinations thereof wherein the derivatizing agent has a ratio of hydroxy-functional acrylate monomer to diisocyanate of about 1.05:1 to about 1.5:1.

2. The UV curable pressure sensitive adhesive composition of claim 1 wherein the ratio is about 1.1:1 to about 1.2:1.

3. The UV curable pressure sensitive adhesive composition of claim 1 wherein the acrylic polymer has a molecular weight of about 40,000 to about 100,000.

4. The UV curable pressure sensitive adhesive composition of claim 1 wherein the hydroxy-functional acrylate monomer is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, caprolactone acrylate, hydroxyl acrylate and combinations thereof.

5. The UV curable pressure sensitive adhesive composition of claim 1 wherein the acrylic polymer comprises at least one backbone hydroxy-functional monomer.

6. The UV curable pressure sensitive adhesive composition of claim 5 wherein the backbone hydroxy-functional monomer is selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate and combinations thereof.

7. An ultraviolet ("UV") curable pressure sensitive adhesive composition comprising a photoinitiator and a derivatized polymer wherein the derivatized polymer comprises an acrylic polymer reacted with about 2% to about 9% by weight solids of a derivatizing agent prepared from a hydroxy-functional acrylate monomer and a diisocyanate from the group consisting of isophorone diisocyanate, toluene diisocyanate and combinations thereof and the derivatizing agent has a ratio of the hydroxy-functional acrylate monomer to diisocyanate of about 1.05:1 to about 1.5:1.

8. The UV curable pressure sensitive adhesive composition of claim 7 further comprising a component selected from the group consisting of an inhibitor, a tackifier, a crosslinking agent, a stabilizer, a filler, a solvent, a plasticizer and combinations thereof.

9. The UV curable pressure sensitive adhesive composition of claim 7 wherein the ratio is about 1.1:1 to about 1.2:1.

10. The UV curable pressure sensitive adhesive composition of claim 7 wherein the acrylic polymer has a molecular weight of about 40,000 to about 100,000.

11. The UV curable pressure sensitive adhesive composition of claim 7 wherein the acrylic polymer comprises a monomer selected from the group consisting of 2-ethylhexyl acrylate, iso-octyl acrylate, iso-decyl acrylate, lauryl acrylate, n-butyl acrylate and combinations thereof.

12. The UV curable pressure sensitive adhesive composition of claim 7 wherein the acrylic polymer comprises a monomer selected from the group consisting of methyl acrylate, ethyl acrylate, methyl methacrylate, styrene, vinyl acetate and combinations thereof.

13. The UV curable pressure sensitive adhesive composition of claim 7 wherein the acrylic polymer comprises at least one backbone hydroxy-functional monomer.

14. The UV curable pressure sensitive adhesive composition of claim 13 wherein the backbone hydroxy-functional monomer is selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate and combinations thereof.

15. The UV curable pressure sensitive adhesive composition of claim 7 wherein the acrylic polymer comprises a functional monomer selected from the group consisting of acrylic acid, methacrylic acid, maleic anhydride, glycidyl methacrylate, N-vinyl pyrrolidone, N-vinyl caprolactam, acrylamide and combinations thereof.

16. The UV curable pressure sensitive adhesive composition of claim 7 wherein the hydroxy-functional acrylate monomer is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, caprolactone acrylate, hydroxyl acrylate and combinations thereof.

17. A method for the application of the UV curable pressure sensitive adhesive of claim 7 to one or more substrates comprising the steps of:
   a. providing at least a first substrate and a second substrate each having one or more surfaces;
   b. providing the pressure sensitive adhesive of claim 7;
   c. applying the pressure sensitive adhesive to a surface of the first substrate;
   d. UV curing the pressure sensitive adhesive; and
   e. mating the surface of the first substrate having the pressure adhesive with a surface of the second substrate to adhere the first substrate and the second substrate.

18. The method of claim 17 wherein the pressure sensitive adhesive is applied at a thickness greater than or equal to about 2 mils.

19. Two or more substrates adhered together by the method of claim 17.

20. A two sided transfer tape comprising a release liner wherein the release liner is coated with a material that comprises the pressure sensitive adhesive composition of claim 7 which has been cured.

* * * * *